Sept. 21, 1948.  A. P. HUHLE  2,449,850
AUTOMOBILE JACK
Filed Feb. 9, 1946  2 Sheets-Sheet 1
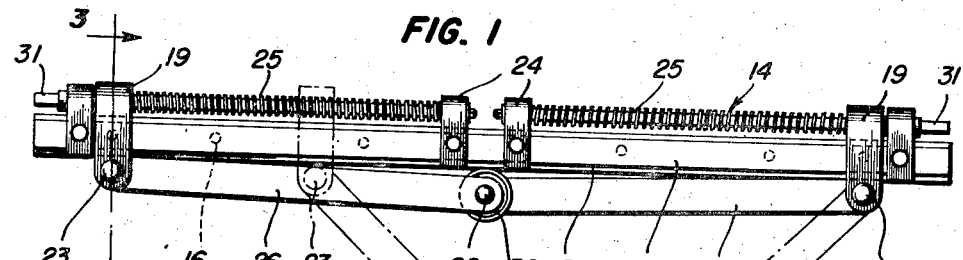
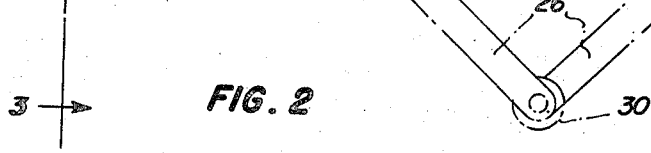
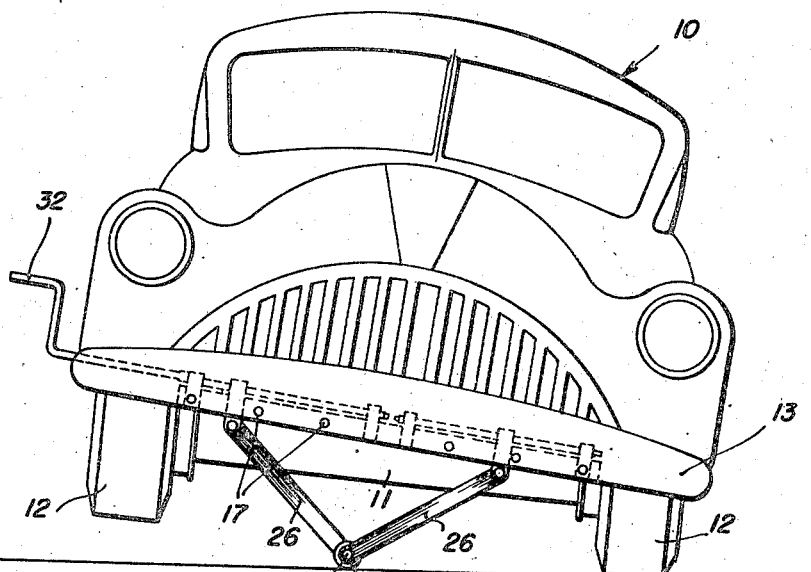
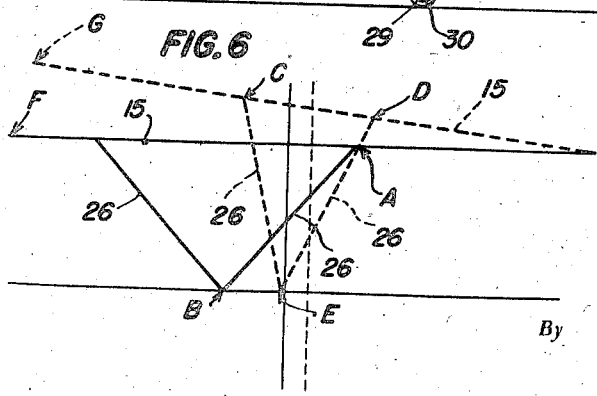
Inventor
ALWIN P. HUHLE
By Clarence A. O'Brien
and Harvey B. Jacobson
Attorney Sept. 21, 1948.  A. P. HUHLE  2,449,850
AUTOMOBILE JACK
Filed Feb. 9, 1946  2 Sheets-Sheet 2
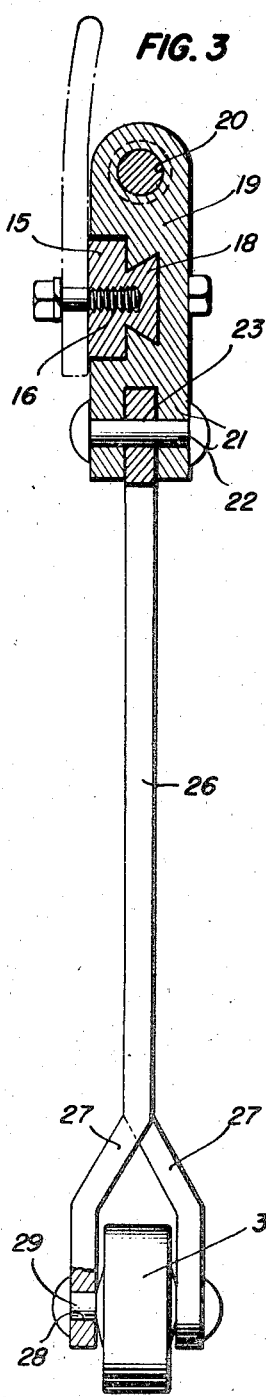
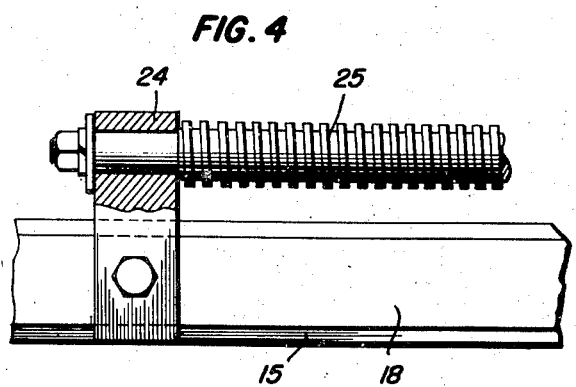
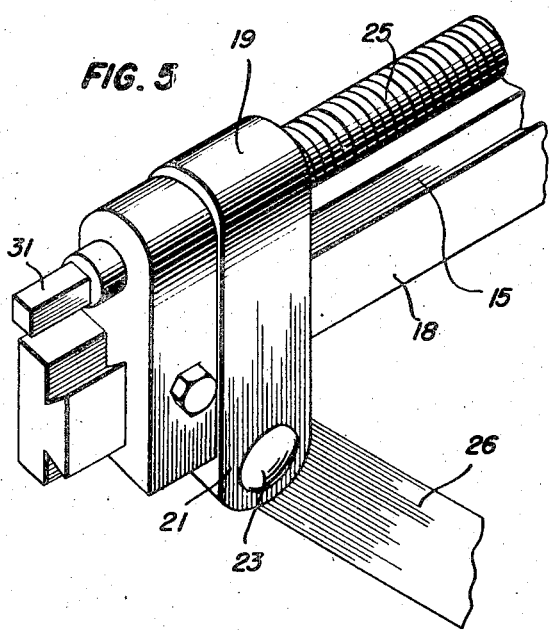
Inventor
ALWIN P. HUHLE
By *Clarence A. O'Brien
and Harvey B. Jacobson*
Attorneys Patented Sept. 21, 1948

2,449,850

UNITED STATES PATENT OFFICE 2,449,850

AUTOMOBILE JACK

Alwin P. Huhle, Elmont, N. Y.

Application February 9, 1946, Serial No. 646,613

3 Claims. (Cl. 254—86)

This invention relates to a vehicle jack and more particularly to a jack for elevating motor vehicles when it is necessary to change a tire or otherwise gain access to the underside of the vehicle.

The primary object of the invention is to facilitate the lifting of a vehicle in such a manner as to allow three of its wheels to remain in contact with the supporting surface.

Another object of the invention is to minimize the effort required manually to elevate the vehicle when it is necessary or desirable to change a tire or gain access to the underside of the vehicle.

Among its features my invention embodies a jack comprising a beam adapted to be carried as a permanent fixture of the vehicle, said beam being fixed to the vehicle in such a manner as to extend transversely of the longitudinal axis thereof, a pair of nuts slidably mounted on the beam, a screw for each nut rotatably supported by the beam in parallel relation thereto and threadedly engaging the nuts, and a pair of lever arms pivotally joined together with their opposite ends connected to opposite nuts so that as the nuts are advanced toward the center of the vehicle the lever arms will be forced downwardly to contact with the supporting surface to elevate the vehicle.

Other features include a roller at the pivotal junction of the lever arms adapted to engage the supporting surface to facilitate the lifting of the vehicle.

In the drawings,

Figure 1 is a front view of a jack embodying the features of this invention,

Figure 2 is a view of a motor car illustrating the jack in use to elevate one of the wheels thereof, Figure 3 is an enlarged transverse sectional view taken substantially along the line 3—3 of Figure 1, Figure 4 is a fragmentary enlarged view partially in section showing the mounting of the jack screws, Figure 5 is a fragmentary perspective view of one end of the device, and Figure 6 is a diagrammatic view illustrating the action of the lever arms in lifting a vehicle.

Referring to the drawings in detail a motor vehicle designated generally 10 is provided with the usual axle 11 supporting at opposite ends wheels 12. This vehicle is provided with the usual bumper 13 and is shown as having attached to said bumper my improved jack though it is to be understood that the jack may be attached to the axle 11 or to any other convenient part of the vehicle so that it extends transversely of the longitudinal axis thereof.

My improved jack designated generally 14 comprises a beam 15 which is provided at longitudinally spaced points with openings 16 for the reception of attaching bolts 17 by means of which the beam may be attached to the bumper 13 as illustrated in Figure 2. The beam 15 is provided with a longitudinally extending dove tail 18 which serves as a guide for retaining in sliding relation to the beam a pair of longitudinally slidable nuts 19 each of which is provided with an internally screw threaded aperture 20 and a bifurcated lower end 21 which is pierced as at 22 to receive a pivot 23 the purpose of which will more fully hereinafter appear.

Rotatably supported in a pair of spaced brackets 24 which are attached to the beam 15 substantially midway of its length are oppositely extending screws 25 which are adapted to engage the screw threaded openings 20 of their respective nuts 19 in such a manner that as one or the other of said screws is rotated about its longitudinal axis the nuts 19 will be caused to move longitudinally along the beam 15.

Pivotally supported on each pivot 23 is one end of a lever arm 26, the opposite end of each of which is offset as at 27 and pierced as at 28 to receive a pivot pin 29 which also serves as the axle shaft of a ground contacted roller 30.

These lever arms 26 are essentially equal in length to one-half of the beam 15 so that when the screws 25 are turned to move the nuts to a point adjacent opposite extremities of the beam 15 the lever arms and roller will be elevated into the position illustrated in Figure 1, in which position they normally remain until such time as is desired to use the jack.

As illustrated in the drawings the extreme outer ends of the screws 25 terminate in squared portions 31 which are adapted to be received in the socket of a suitable socket wrench 32 by means of which the screws 25 may be rotated in the brackets 24 and nuts 19.

When it is desired to elevate a vehicle as suggested in Figure 2 I find it preferable to fix the wrench 32 onto the squared end 31 of the screw 25 on the right hand side of Figure 1 and by turning the screw, advancing the nut to the position A in Figure 6. This will cause the lever arms 26 to assume the position shown by the full lines in Figure 6 so that the roller 30 will contact the supporting surface at the point B in Figure 6. Up to this point the jack has exerted no lifting effort on the vehicle but is merely being placed in position to bring about proper elevation thereof. Detaching the wrench 32 from the squared end 31 of the screw on the right hand side of the jack the wrench is then positioned on the squared end of the screw on the left hand side of the jack as illustrated in Figure 2 and upon turning the screw 25 on that side of the jack in a direction to advance the nut 19 toward the center of the beam 15 it will be obvious that the nut on the left hand side of the jack will advance along the beam to the position C in Figure 6 while the arms 26 will assume the dotted line position illustrated in Figure 6 and the nut originally at position A will elevate to the position D with the bar 15. As the nut approaches the position C the surface contacting roller 30 will move from the position B to the position E in Figure 6 so as to throw the left hand end of the beam 15 upwardly from its initial position at F into the elevated position G. Inasmuch as the beam 15 is rigidly attached to the vehicle 10 it will be obvious that the vehicle will follow the movements of the beam 15 as suggested in Figure 2. Obviously by reversing the procedure just described and first turning the screw 25 on the left hand side of the jack and then transferring the turning motion to the screw 25 on the right hand side of the jack the vehicle may be caused to tilt in a direction reverse to that illustrated in Figure 2.

While in the foregoing there has been shown and described the preferred embodiment of this invention it is to be understood that minor changes in the details of construction, combination and arrangement of parts may be resorted to without departing from the spirit and scope of the invention as claimed.

What I claim is:

1. A jack comprising a beam, separate axially aligned screws supported on the beam for independent rotation, a nut operatively connected to each screw and mounted to move longitudinally of the beam as its respective screw is turned, means selectively to rotate the screws, a lever arm pivoted to each nut and a pivot joining the lever arms whereby when one or the other of the nuts is advanced along the beam the lever arms will be moved away from the beam.

2. A jack comprising a beam, separate axially aligned screws supported on the beam for independent rotation, a nut operatively connected to each screw and mounted to move longitudinally of the beam as its respective screw is turned, a lever arm pivoted to each nut, a pivot joining the lever arms whereby when one or the other of the nuts is advanced along the beam the lever arms will be moved away from the beam and a ground contacting roller rotatably mounted at the junction of the lever arms.

3. A jack comprising a beam adapted to be rigidly fixed to a motor driven vehicle transversely of the longitudinal axis thereof between an end of the body and an adjacent bumper, a pair of brackets fixed to the beam on each side of its longitudinal center, a screw rotatably mounted in each pair of brackets, a nut mounted to slide on the beam between each pair of brackets, said nuts threadedly engaging the screw on its respective side of the beam whereby upon rotation of either screw its respective nut will be moved along the beam, depending ears on each nut, a pair of levers, one end of each lever being pivoted to a nut between its ears, the opposite ends of the levers being pivoted together and a ground contacting roller carried by the pivot joining the levers.

ALWIN P. HUHLE.

REFERENCES CITED

The following references are of record in the file of this patent:

UNITED STATES PATENTS

| Number | Name | Date |
|---|---|---|
| 1,387,905 | Rapson | Aug. 16, 1921 |
| 1,918,783 | Redding | July 18, 1933 |
| 2,054,455 | Tozzi | Sept. 15, 1936 |